United States Patent [19]
Fröhlich

[11] Patent Number: 5,729,951
[45] Date of Patent: Mar. 24, 1998

[54] ANCHORING DEVICE FOR THE CONSTRUCTION INDUSTRY

[75] Inventor: Klaus Fröhlich, Pforzheim, Germany

[73] Assignee: Halfen GmbH & Co. Kommanditgesellschaft, Langenfeld-Richrath, Germany

[21] Appl. No.: 686,737

[22] Filed: Jul. 26, 1996

[30] Foreign Application Priority Data

Jul. 26, 1995 [EP] European Pat. Off. .............. 95111753

[51] Int. Cl.⁶ .................................................. E04B 1/38
[52] U.S. Cl. ................................. 52/698; 52/707
[58] Field of Search ..................... 52/698, 711, 707, 52/708, 704, 705

[56] References Cited

FOREIGN PATENT DOCUMENTS

| | | |
|---|---|---|
| 0226710 | 7/1987 | European Pat. Off. . |
| 0400588 | 12/1990 | European Pat. Off. . |
| 9405869 | 3/1994 | European Pat. Off. . |
| 8708531 | 1/1988 | Germany . |
| 3918044 | 12/1990 | Germany . |
| 4228463 | 3/1994 | Germany . |
| 4228464 | 3/1994 | Germany ............................ 52/698 |
| 276204 | 9/1951 | Switzerland . |

*Primary Examiner*—Creighton Smith
*Attorney, Agent, or Firm*—Robert W. Becker & Associates

[57] ABSTRACT

An anchoring device for the construction industry has an anchor rail that is C-shaped in cross-section and has a hollow interior so that the anchor rail has a back and legs connected to the back. The legs have angled free ends pointing toward one another and delimiting therebetween a longitudinal slot. The back has outwardly extending projections, each having an opening. Each opening has a double cone rim widening radially outwardly from the opening with radially outwardly diverging first and second conical surfaces. The double cone has an outer edge facing outwardly relative to the hollow interior. A plurality of anchors is connected to the anchor rail, whereby each one of the anchors is received in one of the openings and attached thereto by plastic material deformation of the anchor rail and/or the anchor. The anchor has a cylindrical shaft with a head and a base opposite the head. The base of the shaft is positioned in the opening. In an initial state of the anchor, before attachment to the anchor rail, the shaft and the base have a cross-section that is smaller than the cross-section of the outer edge. The plastic material deformation of the base engages the double cone of the rim.

13 Claims, 7 Drawing Sheets

ANCHORING DEVICE FOR THE CONSTRUCTION INDUSTRY

BACKGROUND OF THE INVENTION

The present invention relates to an anchoring device for the construction industry comprised of an anchor rail and anchors connected to the anchor rail. The anchor rail is substantially C-shaped in cross-section and its legs have angled end pieces which delimit a continuous longitudinal slot. At the back of the anchor rail outwardly extending projections are provided which have an opening with a rim that widens radially outwardly from the opening in the shape of a double cone with radially outwardly diverging first and second conical surfaces. The anchor comprises a head and a cylindrical shaft as well as a base which is inserted into the opening of one of the projections and is secured thereat by plastic material deformation, especially by swaging/upsetting.

In a known anchoring device of the aforementioned kind according to European Patent Application 226 710 the anchor to be inserted into the anchor rail is embodied such that the base is designed like a conical countersunk head screw with an adjacent cylindrical section which has a stepped transition into the cylindrical shaft of the anchor. The conical section of the base is matched to the inner surface of the projection at the anchor rail. The anchor is inserted through the longitudinal slot of the anchor rail into the opening of the projection so that the conical section is fitted into the projection while the adjacent cylindrical section is surrounded by the outwardly widened rim of the opening. The anchor is swaged for fastening it to the anchor rail such that the cylindrical section is plastically deformed until abutment at the outwardly widened edge of the opening is achieved so that a positive-locking connection between the anchor and the anchor rail is achieved. The shaping of the anchor to be inserted into the anchor rail as well as of the anchor rail thus requires precise and expensive manufacturing processes because the conical sections of both must be matched to one another.

In another known anchor rail (European application 400 588) the anchor is of a two part design. The anchor shaft with anchor head is comprised of inexpensive construction steel and the anchor base is a sleeve made of stainless steel which has a collar for abutment at the edge of the cylindrical opening which is provided at the projection of the back of the anchor rail. The anchor is introduced from the exterior into the anchor rail so that it rests with the collar of the base at the back of the anchor rail and, subsequently, the inwardly positioned part of the base of the anchor is plastically deformed by swaging (upsetting) whereby the material adapts to the inner surface of the projection at the anchor rail. This embodiment of the anchor rail is also very expensive with respect to the required manufacturing technique.

It is therefore an object of the present invention to reduce the material and manufacturing costs for the anchor rail to a minimum, while the pulling resistance of the anchor and the stability of the connection between the anchor and the anchor rail should not be impaired.

SUMMARY OF THE INVENTION

The present invention relates to an anchoring device for the construction industry which is primarily characterized by:

An anchor rail being C-shaped in cross-section and having a hollow interior such that the anchor rail has a back and legs connected to the back, the legs having angled free ends pointing toward one another, wherein between the angled free ends a longitudinal slot is delimited;

The back having outwardly extending projections each having an opening;

Each opening having a rim widening radially outwardly from the opening in the shape of a double cone with radially outwardly diverging first and second conical surfaces, wherein the double cone has an outer edge facing outwardly relative to the hollow interior;

A plurality of anchors connected to the anchor rail, wherein each anchor is received in one opening and attached thereto by a plastic material deformation of at least one of the anchor rail and the anchor;

The anchor comprising a cylindrical shaft with a head and a base opposite the head, wherein the base of the shaft is positioned in the opening;

Wherein, in an initial state of the anchor before attachment to the anchor rail, the shaft and the base have a cross-section that is smaller than a cross-section of the outer edge;

Wherein the plastic material deformation of the base engages the double cone of the rim.

Preferably, the shaft and the base, in the initial state, have a smooth surface free of any projection.

Advantageously, the base, in the initial state, has a smooth surface free of any projection.

Preferably, the head is formed by upsetting.

Advantageously, the anchor comprises a collar at a transition between the shaft and the base.

Preferably, the anchor comprises an annular groove at a transition between the shaft and the base.

Expediently, the plastic material deformation of the rim of the anchor rail comprises a bead positive-lockingly engaging the annular groove.

Advantageously, in the initial state, the shaft and the base have an identical cross-section over the entire length of shaft and base.

Expediently, in the initial state, the shaft, the base, and the head have an identical cross-section over the entire length of the anchor.

In yet another embodiment of the present invention, in the initial state, the base has a greater cross-section than the shaft and has a stepped transition into the shaft.

Preferably, the anchor supports axial forces, acting on the anchor in a direction toward the longitudinal slot, via the plastic material deformation of the base engaging the first conical surface located adjacent to the outer edge.

Expediently, the base overlaps positive-lockingly the first conical surface.

Advantageously, the anchor has a flattened transition between the base and the shaft and the flattened transition overlaps positive-lockingly the first conical surface.

The present invention also relates to a method for manufacturing an anchoring device, whereby the method is primarily characterized by the following steps:

Providing an anchor rail being C-shaped in cross-section and having a hollow interior such that the anchor rail has a back and legs connected to the back, the legs having angled free ends pointing toward one another, wherein between the angled free ends a longitudinal slot is delimited;

Stamping circular openings into the back;

Introducing an anchor of a circular cross-section, having a head, a shaft, and a base, into each opening from the exterior of the anchor rail such that the base is positioned within the interior so as to be spaced from the slot;

Positioning the anchor in a swaging die comprising multiple die pads;

Pressing the area of the back around the openings to form a conical outer projection so that the rim of the openings widens radially outwardly from the openings in the shape of a double cone with radially outwardly diverging first and second conical surfaces;

Delimiting an annular gap between the first conical surface and the swaging die by abutting a portion of the swaging die at the exterior of the conical projection;

Plastically deforming the base by swaging in the swaging die such that the material of the base fills the interior of the conical projection to the inner conical wall and partly fills the annular gap.

Preferably, the method further comprises the steps of providing the multiple die parts with part-conical surfaces and part-annular end faces;

Positioning the part-conical inner surfaces at the exterior conical mantle surface of the projection and positioning the part-annular end faces at the back of the anchor rail adjacent to the conical projection such that the part-conical inner surfaces and the part-annular end faces form an abutment during the step of plastically deforming.

Preferably, the part-conical inner surfaces project past the outer edge toward the anchor such that the annular gap in axial section of the swaging die is substantially triangular.

Expediently, the method further comprises the steps of:

Providing the die parts with part-cylindrical inner surfaces for receiving the shaft;

Providing transitions between the part-conical surfaces and the part-cylindrical surfaces, the transitions having cutouts with a radial end face and a cylindrical end face such that the annular gap is delimited by the radial end face and the cylindrical end face and extends radially outwardly past the outer edge.

Preferably, the method further comprises the step of providing the die parts with radial end faces adjacent to the conical inner surfaces and extending inwardly from the outer edge, wherein the annular gap is delimited by the first conical surface of the double cone and the radial end faces.

Expediently, the method further comprises the step of forming the head by swaging a cylindrical green anchor in the swaging die.

The present invention also relates to another method for manufacturing an anchoring device, primarily characterized by the steps of:

Providing an anchor rail being C-shaped in cross-section and having a hollow interior such that the anchor rail has a back and legs connected to back, the legs having angled free ends, pointing toward one another, wherein between the angled free ends a longitudinal slot is delimited;

Stamping circular openings into the back;

Introducing an anchor of a circular cross-section having a head, a shaft, and a base, into each one of the openings from the exterior of the anchor rail such that the base is positioned within the interior so as to be spaced from the slot, the anchor having an annular groove at a transition between the shaft and the base;

Positioning the anchor in a swaging die comprising multiple die parts;

Pressing the area of the back around the openings to form conical outer projection so that the rim of the openings widens radially outwardly from the openings in the shape of a double cone with radially outwardly diverging first and second conical surfaces, wherein the annular groove is positioned adjacent to the first conical surface of the double cone;

Abutting a portion of the swaging die at the exterior of the conical projection;

Plastically deforming the base by swaging in the swaging die such that the material of the base fills the interior of the conical projection to the inner conical wall;

Simultaneously plastically deforming the rim such that the material of the rim flows into the annular groove.

With the inventive anchoring device, the anchors can be of a very simple design so that they can be mass-produced in an inexpensive manner whereby the anchor shaft in cross-section must be selected with respect to size only with regard to the pulling force specifications. Preferably, the shaft and the base of the anchor have a continuous identical cylindrical cross-section. A special shaping in order to form an abutment for insertion of the anchor into the anchor rail is not required. Since the base of the anchor, after fastening of the anchor by plastic material deformation, engages the double cone rim of the opening within the projection of the anchor rail by the plastically deformed material, the anchor is secured in both axial directions with the thus formed positive-locking engagement against displacement. With the exterior portion of the plastic material deformation (deformed material), which rests on the outwardly extending rim portion of the opening, the anchor is secured against falling out of the anchor rail in the direction of its longitudinal slot while the other portion of the plastic material deformation (deformed material) of the base rests at the inner rim portion of the opening and is shaped to the inner portion of the projection of the back of the anchor rail so that it can easily introduce the pulling forces from the anchor into the anchor rail.

According to the inventive method for manufacturing such an inventive anchoring device, the back of the anchor rail is provided with circular openings. The cylindrical anchors are then inserted from the exterior into the openings and the base of the anchor is plastically deformed by swaging/upsetting. The plastically deformed material flows into the interior space of the outwardly oriented projections which are formed in the area surrounding the openings within the back of the anchor rail. Subsequently, the swaged material flows outwardly so that the deformed base of the anchor engages the double cone rim of the opening. For supporting the anchor during the deformation step, a swaging die is provided which secures the anchor in its position and which forms, together with the double cone rim of the respective opening, an annular gap into which the material of the base of the anchor can flow during swaging.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 7B.

Figure 1:
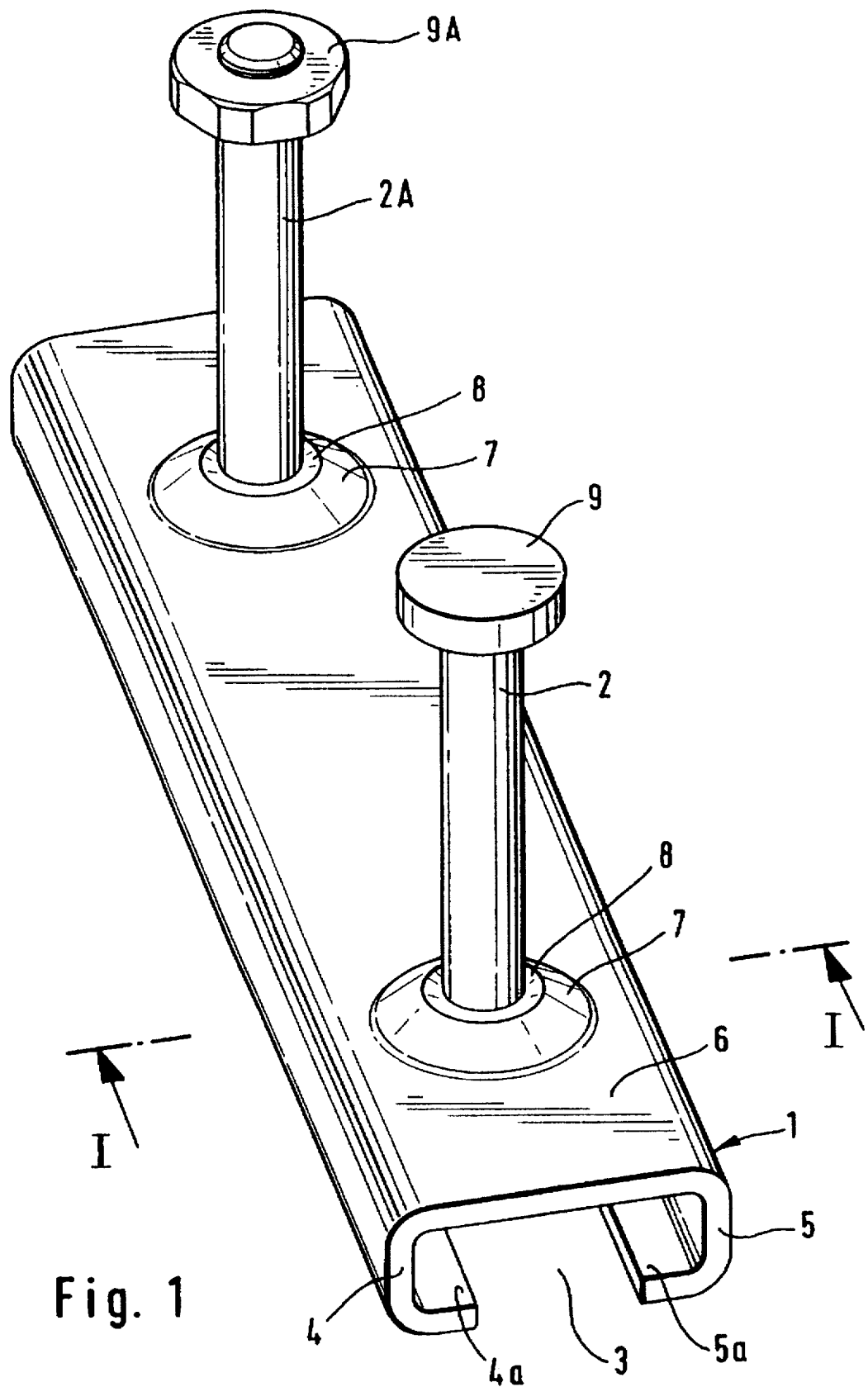
FIG. 1 shows schematically a perspective representation a portion of an anchoring device with inserted anchors.

FIG. 1 shows schematically in a perspective view a portion of the inventive anchoring device comprised of an anchor rail 1 and anchors 2 and 2A inserted therein. The anchor rail 1 comprises a longitudinal slot 3 extending over its entire length which is delimited by angled free ends 4a, 5a of the two legs 4 and 5. Opposite the longitudinal slot 3 the back 6 of the anchor rail is positioned. The back 6 is provided with outwardly extending conically tapering projections 7 which are provided with a central circular opening 8 through which the respective anchor 2, 2A is inserted. The anchor 2 has a head formed by swaging/upsetting. The head of the anchor 2A is embodied as a nut 9A threaded onto the free end. Such a design of the anchor can be suitable for special applications. However, the embodiment of the anchor 2 with swaged (upset) head 9 is less expensive and thus preferred.

The section line I—I indicates the cross-section in which the various embodiments of the anchoring device are represented in the drawings.

Figure 2A:
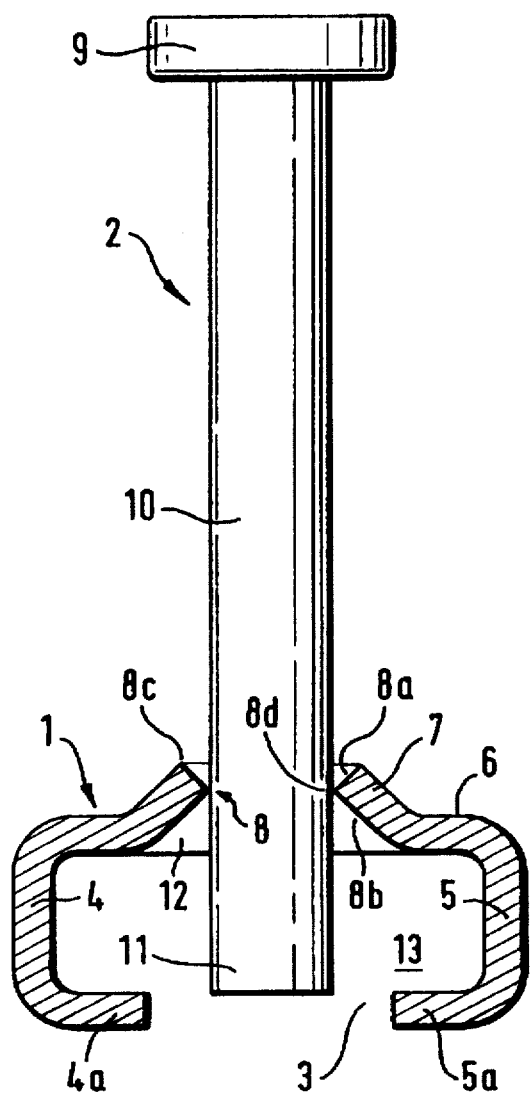
FIGS. 2A and 2B show a cylindrical anchor with anchor head having a continuous cylindrical embodiment.

FIG. 2A shows an anchor 2 with formed head 9, shaft 10, and base 11 after insertion into the anchor rail 1 in a position ready for swaging. The projection 7 at the back 6 of the anchor rail 1 is upwardly conically tapered and comprises the opening 8 having a rim in the shape of a double cone with radially outwardly diverging conical surfaces 8a and 8b. This projection 7 in the embodiment shown is formed before introduction of the anchor 2 into the anchor rail 1 by pressing the surrounding area of the opening 8. However, it is also possible to produce the conical projections 7 during fastening of the anchors at the anchor rail. For this purpose, the end of the anchors projecting through the opening 8 is swaged. This will be disclosed in detail in the following.

The outer edge 8c of the opening 8 has a greater diameter, due to the deformation step which forms the projection 7, than the inner edge 8d which defines the smallest cross-section (diameter) of the opening 8. The inner conical surface 8b of the opening 8 delimits a truncated conical space 12 which is an extension of the interior 13 of the anchor rail having a substantially rectangular cross-section.

The shaft 10 and the base 11 of the anchor 2 have a continuous cylindrical cross-section of identical circular shape over the entire length of shaft and base. The head 9 which is formed thereat is also cylindrical. Anchors of such a design can be mass-produced cheaply as a steel bolt. The steel quality and the diameter of the anchor are selected according to the respective pulling resistance (load bearing) specifications.

Figure 2B:
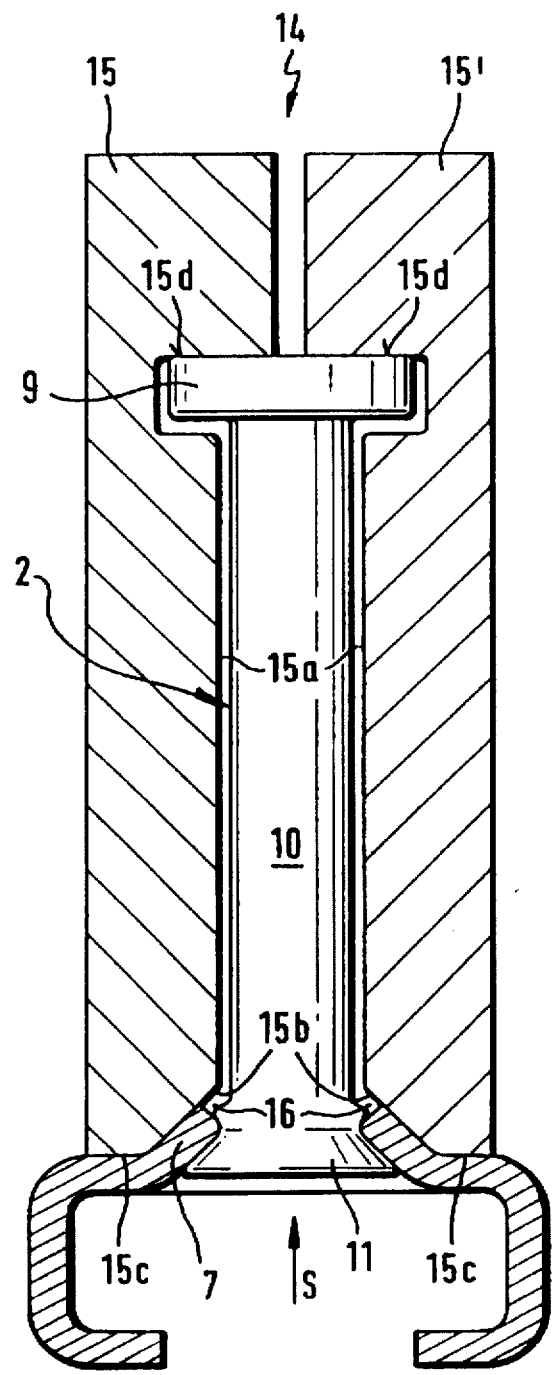

FIG. 2B shows a forging or swaging die 14 which is comprised of two mirror-symmetrical die parts 15 and 15'. These die parts 15, 15' can be reciprocated toward and away from one another. The two die parts 15, 15' have in cross-section semi-circular (cylindrical) inner surfaces 15a with which the shaft 10 of the anchor 2 is surrounded in the operational position of the swaging die 14 in which they function as clamping jaws. The inner surfaces 15a are widened to a part-conical surface 15 at the lower end of the die which matches the cone angle of the outer mantle surface of the conical projection 7 at the anchor rail. The die parts 15 and 15' rest in the operational position of the swaging die 14 with their lower surfaces 15c on the areas adjacent to the projection 7 on the back 6 of the anchor rail. The surfaces 15b and 15c as well as upper surfaces 15d resting on the anchor head provide abutments during swaging of the anchor. The base 11 is deformed during swaging in the direction of arrow S.

For swaging the base of the anchor, a die plunger (not represented) is inserted into the interior of the anchor rail. Due to the pressure, which acts via the die plunger and the abutments of the die 14, the material of the base 11 begins to flow and fills the truncated cone-shaped space 12 of the anchor rail until it comes to rest at the conical surface 8b of the opening 8. The conical inner surfaces 15b of the die 14, together with the conical surface 8a of the opening 8, form an annular gap 16 into which material of the base 11 also flows. After termination of the plastic material deformation, the base 11 thus engages the rim 8a, 8b of the opening 8 in a positive-locking manner as is shown in FIG. 2B. When the projection 7 of the anchor rail 1 has been preformed, its outer mantle surface remains unchanged during the plastic deformation process of the base as well as the outer surface of the back 6 because the die parts 15, 15' are exactly matched to this performed shape. The forming of this projection, however, can also take place during swaging of the anchor whereby the back 6 is initially not formed. In this scenario, the projection adapts to the shape of the die parts 15, 15'. Such a simultaneous deformation of the base 11 of the anchor and of the back 6 of the anchor rail during swaging of the anchor is possible with all embodiments of the invention (FIGS. 2 through 7).

The diameter of the base 11 and thus of the anchor shaft 10 is somewhat smaller than the smallest diameter of the opening 8 but only by so much that the anchor can be inserted into the anchor rail without jamming.

As is shown in FIG. 2B, the annular gap 16 in the shown axial section is substantially triangular. However, any other suitable form can be selected.

Figure 3A:
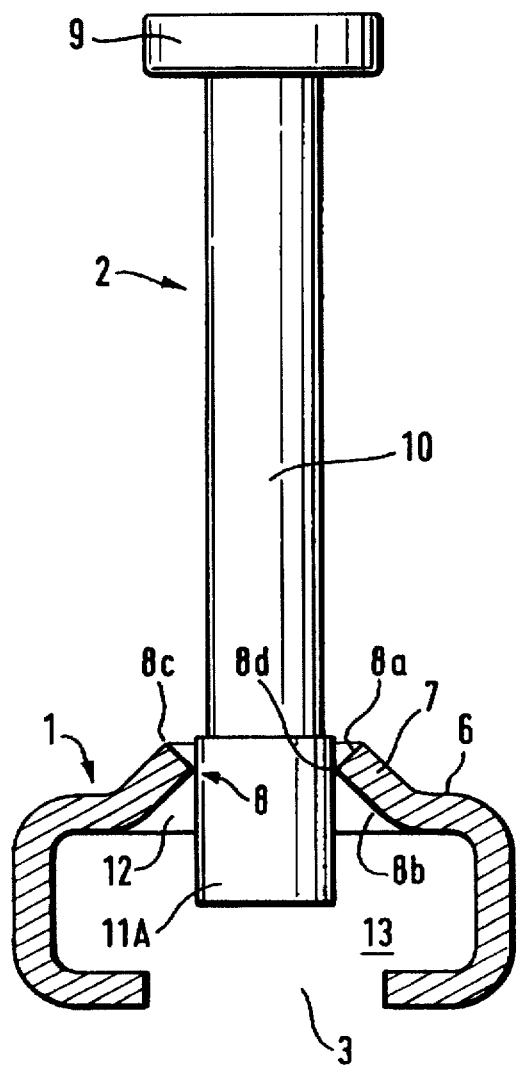
FIGS. 3A and 3B show an anchor with cylindrical shaft and a cylindrical base having a greater diameter than the cylindrical shaft.
Figure 3B:
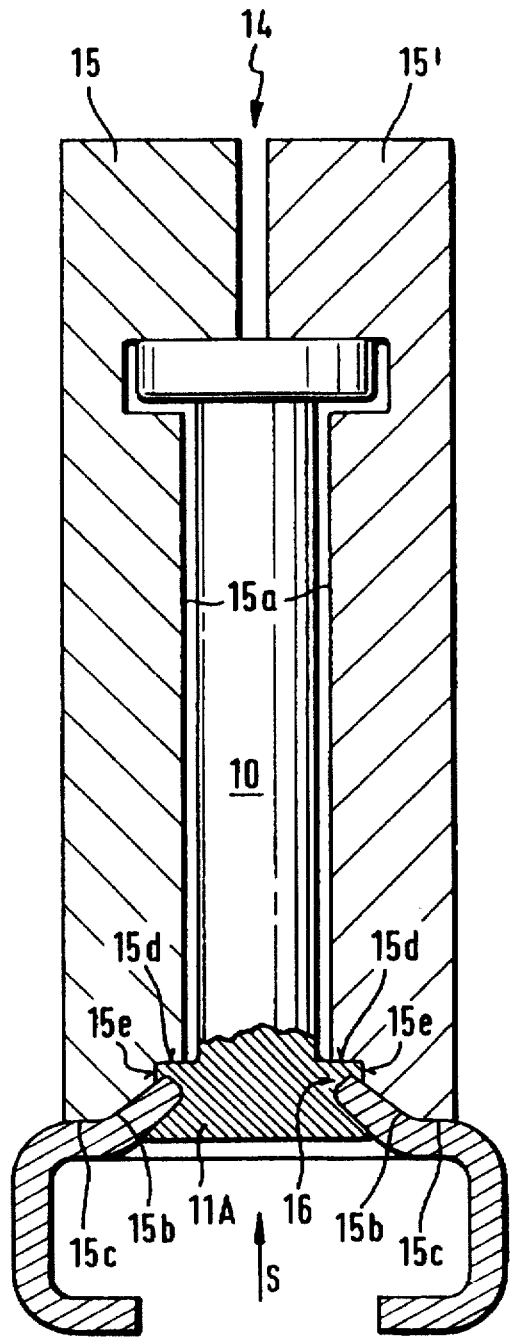

FIGS. 3A and 3B show a further embodiment of such an annular gap.

The anchor 2 according to FIGS. 3A and 3B in the initial state (non-swaged) as shown in FIG. 3A has a substantially cylindrical base 11A which has a slightly greater diameter than the shaft 10 so that it has a stepped transition into the shaft. The base 11A is inserted into the opening 8 with little play relative to the inner edge 8d and ends at a great distance, as compared to the embodiment according to FIG. 2A, above the longitudinal slot 3 of the anchor rail 1. This difference results from the greater cross-section of the anchor base 11A because in this scenario the material of the shorter anchor base 11A is sufficient for filling the truncated cone space 12 of the projection 7. Thus, in sum total, the amount of material required for this anchor is not greater than that for the anchor according to FIG. 2A.

The die 14 of FIG. 3B has at the lower portion of its two die parts 15, 15' a recess which provides a radial end face 15d extending radially to the longitudinal axis of the die and an adjacently positioned cylindrical side surface 15e.

This side surface 15e has a transition into the conical inner surface 15b of the die which has a transition at an oblique angle into the lower surface 15c of the two die parts. The annular gap 16 in this embodiment is delimited by the surfaces 15d and 15e of the die parts 15 and 15' as well as by the outer conical surface 8a of the opening 8 and a portion of the outer conical surface of the projection 7. In the represented axial section the annular gap 16 projects past the outer edge 8c of the opening 8 with the two delimiting surfaces 15d and 15e f the die parts which extend at a right angle to one another. Otherwise, the dies according to FIGS. 2B and 3B are identical and enclose the anchor.

As can be seen in FIG. 3B, in this embodiment of the anchor and of the die it is ensured that the material of the base of the anchor flows during plastic material deformation to the delimiting surfaces of the annular gap 16 so that the base, after plastic material deformation, projects past the rim of the opening 8 to the outer edge 8c and positive-lockingly engages together with the material in the space 12 the wall of the projection 7. Thus, the anchor is provided with an especially reliable attachment to the anchor rail 1.

Figure 4A:
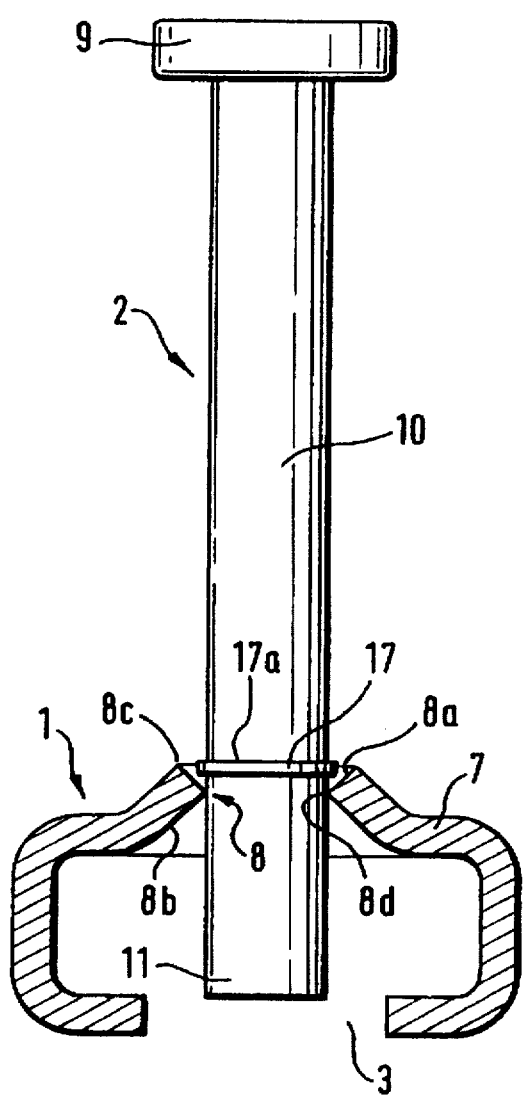
FIGS. 4A and 4B show an anchor with anchor head with continuous cylindrical shaft with collar.
Figure 4B:
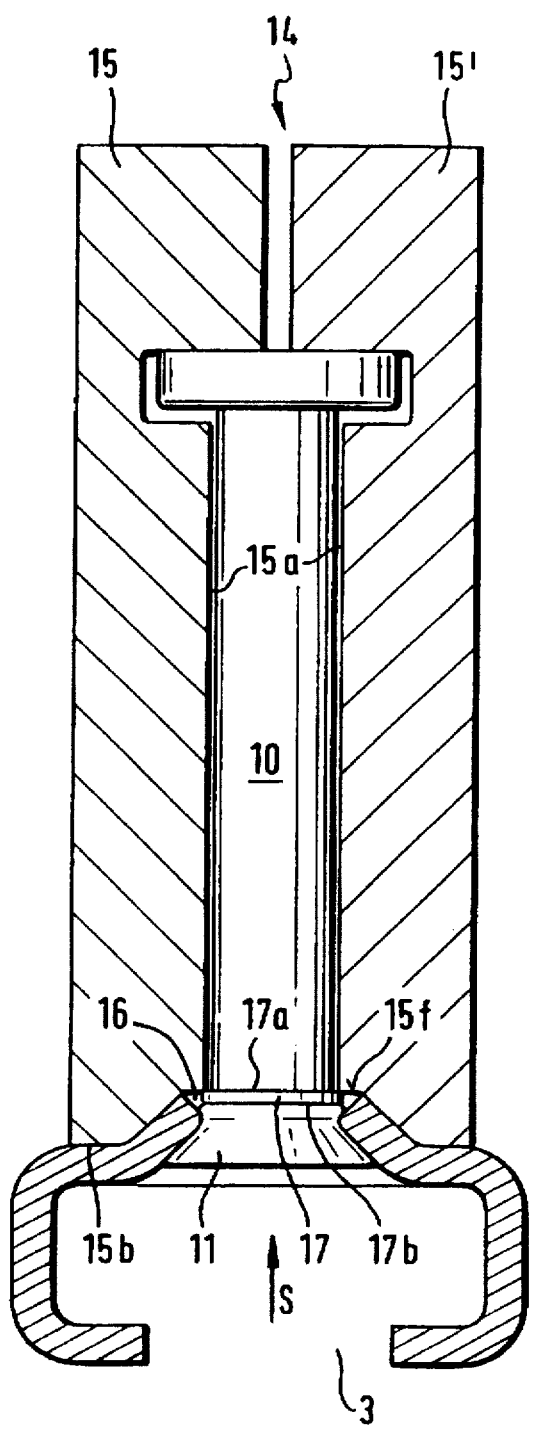

In the embodiment according to FIGS. 4A and 4B the shaft 10 and the base 11 of the anchor 2 are provided with a continuous cylindrical shape of identical diameter like the anchor of FIG. 2A. At the transition between the shaft and the base a collar 17 is provided which after insertion of the anchor is positioned freely above the inner edge 8d of the opening 8 and is thus spaced from the outer conical surface 8a of the opening. The upper end face 17a of the collar 17 is positioned approximately at the same level as the upper outer edge 8c of the opening 8. In this position, the anchor is secured by the die 14 (FIG. 4B), whereby the upper end face 17a of the collar 17 rests at the radial end face 15f f the die which end face 15f extends radially to the longitudinal axis of the die. This end face 15f together with the outer conical surface 8a of the opening 8 form the annular gap 16 which in axial section is approximately of a triangular shape and has a transition at an obtuse angle into the conical inner surface 15b of the die. The end face 15f formed by the two die parts 15 and 15', serves as an abutment for swaging the base 11 of the anchor 2 at which abutment the upper end face 17a of the collar 17 rests. The lower end face 17b of the collar 17 limits the flow of the material during the swaging process so that the corresponding plastic material deformation of the base 11 ends at the collar 17 and engages together with the collar 17 the lower (inner) edge 8d of the opening 8. Thus, in this embodiment the plastically deformed portion of the base 11 also serves for securing the anchor 2 against axial displacement toward the longitudinal slot 3 of the anchor rail, but the deformed portion is covered by the collar 17 and its upper end face 17a thus provides a planar upper surface for the upper edge of the base.

Figure 5A:
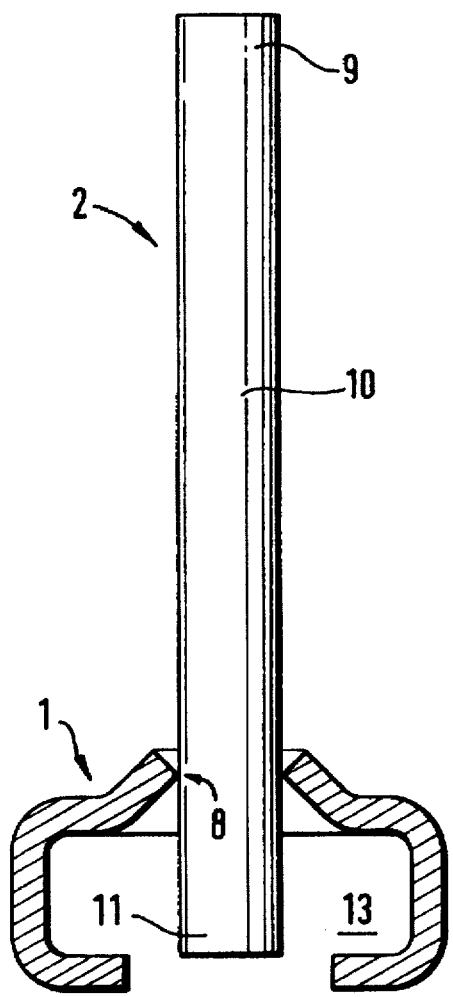
FIGS. 5A and 5B show an anchor, which in the initial state as a green anchor is continuously cylindrical (FIG. 5A), and a representation of the swaging die with deformed anchor (FIG. 5B)
Figure 5B:
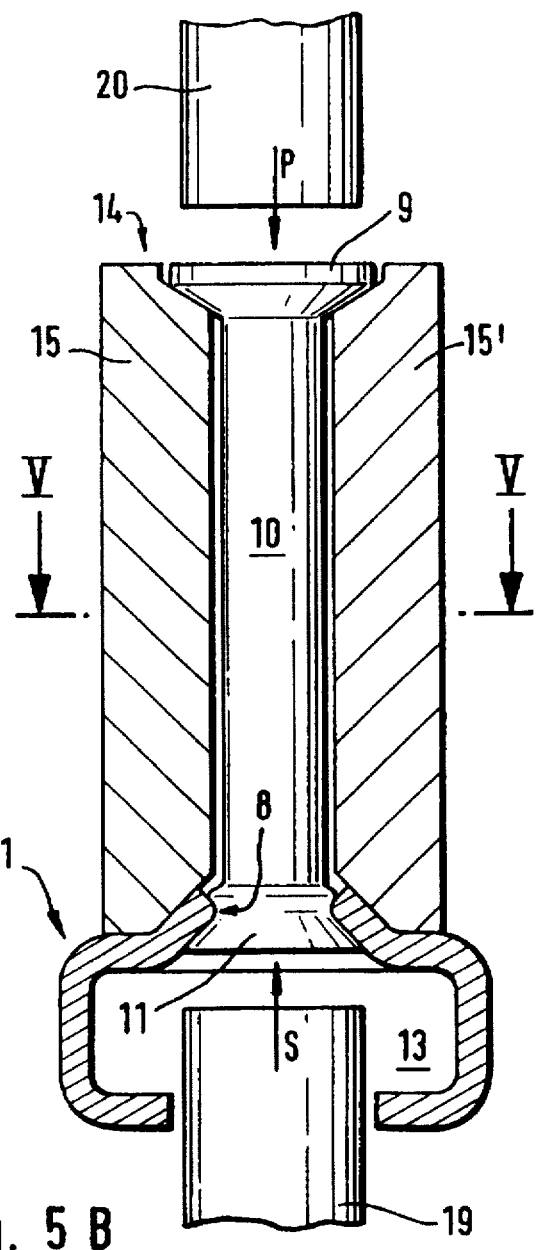
Figure 5C:
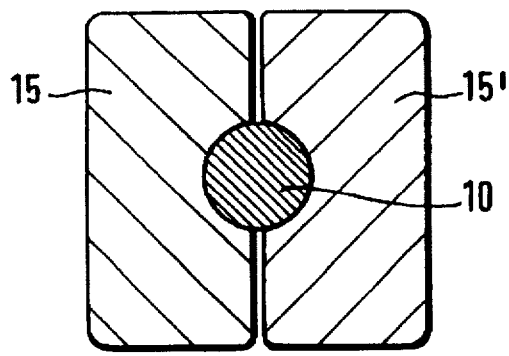
FIG. 5C shows a section along section line V—V of FIG. 5B.

In FIGS. 5A, 5B, and 5C, an anchor 2 with a swaging die 14 is shown. This embodiment allows for an especially inexpensive manufacture of the anchoring device. The anchor 2, before material deformation, is comprised of a continuous cylindrical green anchor (FIG. 5A) which has been produced by cutting to length a massive rod-shaped material. One end of this cylindrical green anchor forms the head 9, the other end forms the base 11, and the section in between forms the shaft 10. The die 14 at the upper end is embodied like the die of FIG. 2B, while the lower end of the die in its closed state is conical. After insertion of the green anchor into the anchor rail 1, the die 14 is closed and, subsequently, the die plunger 19 is inserted through the longitudinal slot 3 of the anchor rail 1 into the interior 13, as indicated by arrow S. At the same time, a second plunger 20 is advanced in the direction of arrow P to the other end of the green anchor. The two plungers 19 and 20 swage the green anchor at both ends and thus provide respective abutments for the other plunger 20, respectively, 19. During swaging, the base 11 is deformed according to the embodiment of FIG. 2B so that the rim of the opening 8 is engaged by the material of the plastic deformation. At the same time, the head 9 of the anchor 2 is formed by plastic material deformation within the die 14 to a widened part. The shape of this widened head 9 is determined by the shape of the die 14. The base 11 of the anchor 2 can be produced in various shapes according to the design of the die 14. It is only important to realize that the material of the anchor during swaging is caused to flow such that the base 11 engages the rim of the opening 8 and thus positive-lockingly attaches the anchor to the anchor rail. In the embodiment according to FIGS. 5A and 5B the manufacture of the anchor rail is especially simple because the green anchor for the anchor 2 can be produced inexpensively from raw material by simply cutting it to length and the finished shape of the anchor 2 with widened base 11 and widened head 9 can be produced in a single swaging step within the die 14 whereby the positive-locking connection between anchor and anchor rail is produced.

FIG. 5C shows schematically, in a section along line V—V of FIG. 5B, the die 14 whereby the two die parts 15, 15' tightly engage the anchor shaft 2 when closing the die 14. This closed position is also provided for the dies of other embodiments. In the represented axial section of the die 14, for the purpose of a better differentiation of the die pads 15 and 15' from the anchor shaft 10, a gap is shown between the die and the anchor shaft which, however, is not present during the swaging process when the die is closed. Instead, the die pads are tightly positioned at the anchor shaft 10 which should not be deformed by the swaging process.

The represented die 14 is comprised of two die pads 15 and 15' which in the closed position tightly surround the anchor shaft 10 so that between the facing surfaces of the die pads a gap of only a minimal width is present. Instead of a two-part die it is also possible to use a multi-part die comprised of, for example, four, six, or eight parts.

Figure 6B:
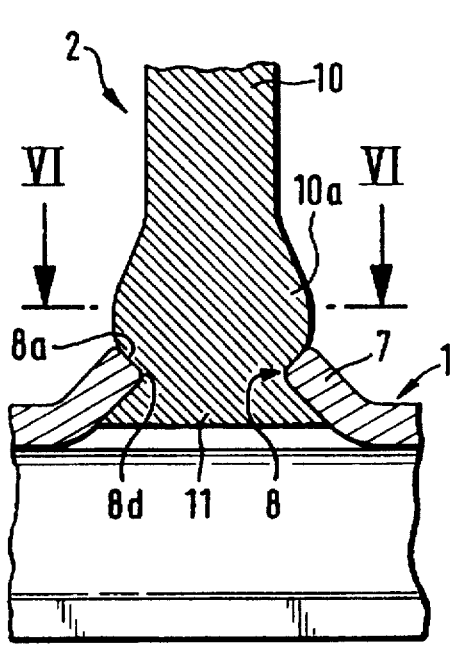
FIG. 6B shows the lower end of the anchor according to FIG. 6A in axial section taken at a right angle to FIG. 6A.
Figure 6C:
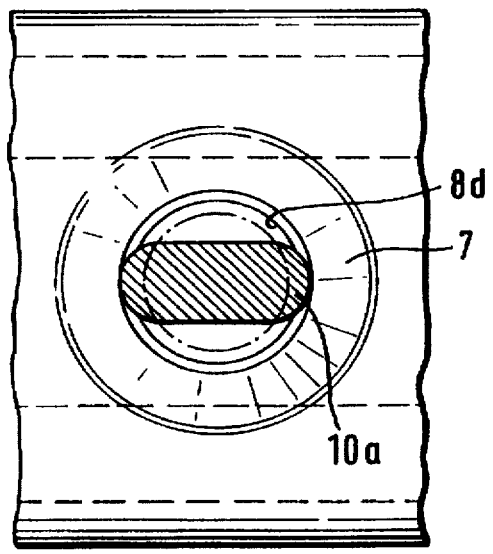
FIG. 6C shows a section along line VI—VI of FIG. 6B.
Figure 6A:
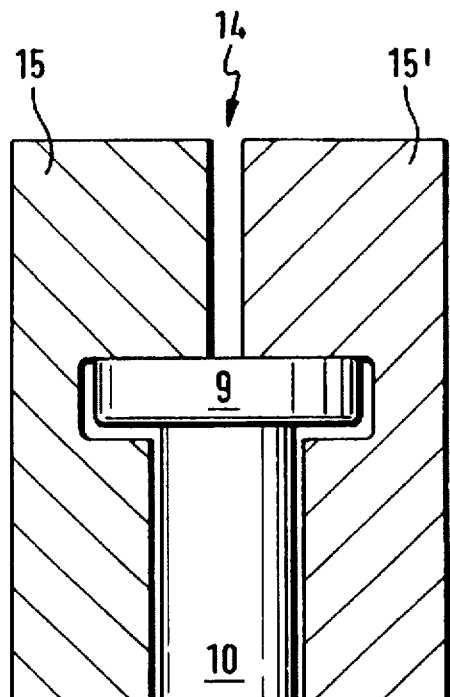
FIG. 6A shows an anchor with cylindrical shaft, which is plastically deformed within the swaging die, in axial section.

FIGS. 6A, 6B, and 6C show an embodiment in which the deformation of the anchor shaft 10 with the base 11 is performed. FIG. 6A shows axial sections of the anchor rail 1 with inserted anchor 2, deformed by swaging, and also of the corresponding die 14. In FIG. 6B an axial section of the anchor rail 1 and the lower end of the anchor 2 with base 11 perpendicular to the axial section of 6A is shown while FIG. 6C shows a section along line VI—VI of FIG. 6B.

In this embodiment the two die parts 15 and 15' are embodied such that the transition portion 10a of the anchor shaft 10 to the base 11 is pressed by closing the die 14 in order to flatten it. The material of the shaft 10 flows outwardly within this transition portion 10a on two oppositely arranged sides of the shaft 10 via the inner edge 8d of the opening 8 of the anchor rail 1, as can be seen in FIGS. 6B and 6C, while below the flattened sides this transition portion 10a of the base 11 is deformed by swaging so that the rim of the opening 8 is form-lockingly engaged, as shown in FIG. 6a. By flattening the anchor shaft 10 in the transition area 10a an especially secure seating of the anchor 2 at the anchor rail 1 is provided. In this embodiment, the widened anchor head 9 can be embodied by swaging, as has been disclosed in connection with FIG. 5B.

Figure 7A:
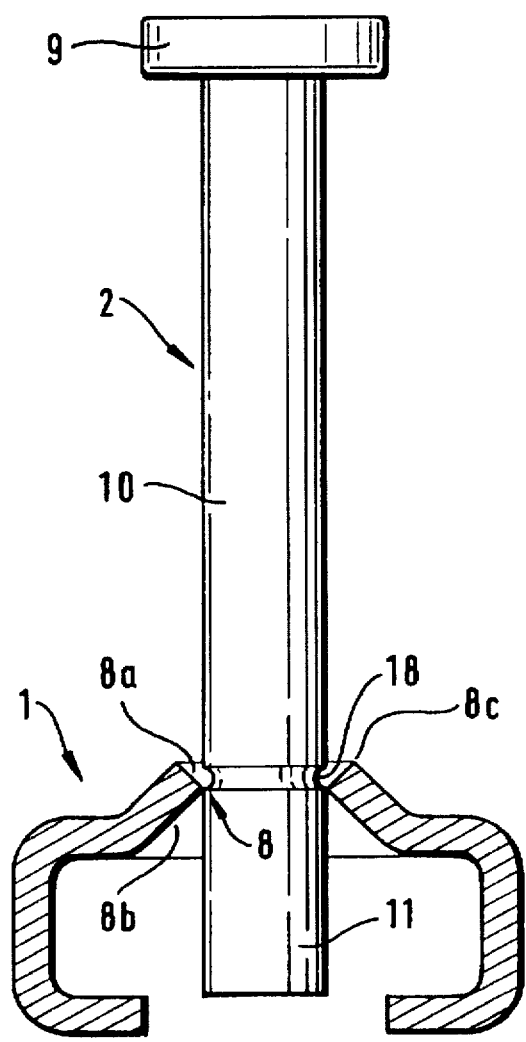
FIGS. 7A and 7B show a cylindrical anchor with anchor head and annular groove.
Figure 7B:
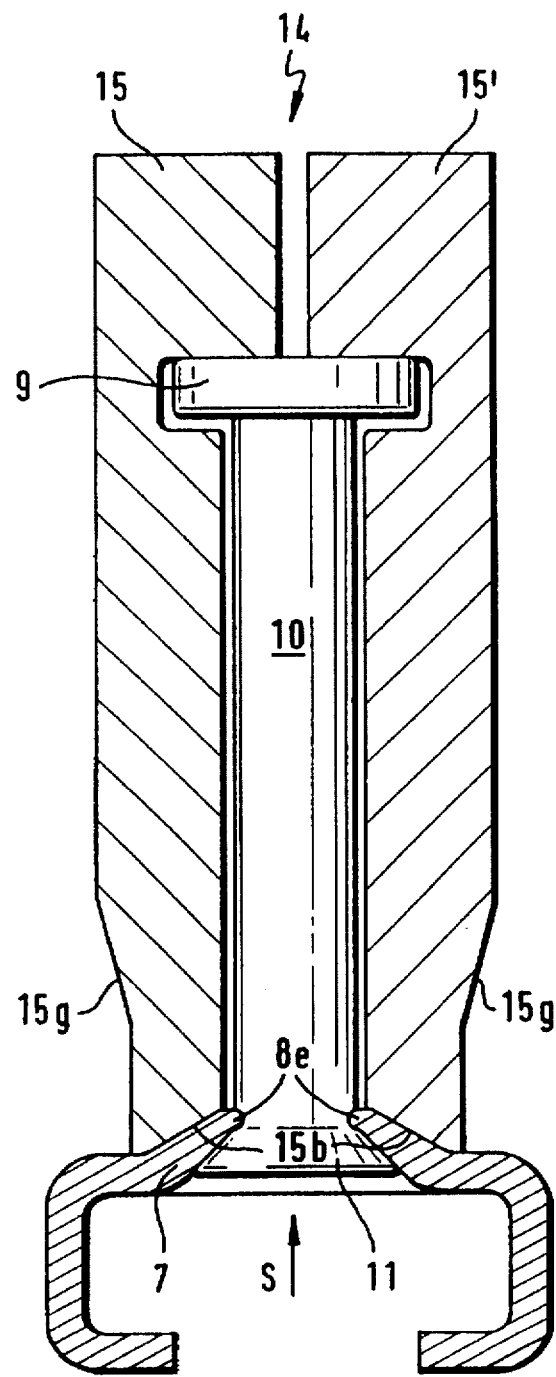

FIGS. 7A and 7B show another embodiment in which the shaft 10 and the base 11 of the anchor have the same diameter, as is shown in connection with FIG. 2A, whereby, however, in the transition area an annular groove 18 is provided. For fastening the anchors the anchor rail 1 has the same shape as disclosed in previous embodiments, but is deformed during the swaging process at the same time as the base 11. For this purpose, the die 14 at its lower end of the two parts 15 and 15' is provided with a suitable shape (FIG. 7B). The two die parts 15 and 15' have respective downwardly conically tapering sections 15g having a transition into a part-cylindrical portion. This part-cylindrical portion has an exclusively part-conical inner surface 15b which rests at the conical exterior surface of the projection 7. The pressure acting during swaging in the direction of arrow S results in a plastic deformation not only of the base 11 but also of the wall of the projection 7 because the outer edge 8c of the opening 8 is forced against the conical surface 15b of the die 14. The material of the anchor rail thus is swaged at the edge of the opening 8 and flows thus into the annular groove 18. FIG. 7B shows that after the swaging process the rim of the opening 8 has been deformed to a bead 8e which fits precisely into the annular groove 18 of the anchor so that the base 11 engages the bead 8e and thus the rim of the opening 8. This results in a substantially perpendicular transition of the anchor shaft 10 into the exterior surface of the projection 7.

The present invention is, of course, in no way restricted to the specific disclosure of the specification and drawings, but also encompasses any modifications within the scope of the appended claims.

What I claim is:

1. An anchoring device for the construction industry, said anchoring device comprising:

an anchor rail being C-shaped in cross-section and having a hollow interior such that said anchor rail has a back and legs connected to said back, said legs having angled free ends pointing toward one another, wherein between said angled free ends a longitudinal slot is delimited;

said back having outwardly extending projections each having an opening;

said openings having a rim widening radially outwardly from said openings in the shape of a double cone with radially outwardly diverging first and second conical surfaces, wherein said double cone has an outer edge facing outwardly relative to said hollow interior;

a plurality of anchors connected to said anchor rail, wherein each one of said anchors is received in one of said openings and attached thereto by plastic material deformation of at least one of said anchor rail and said anchor;

said anchor comprising a cylindrical shaft with a head and a base opposite said head, wherein said base of said shaft is positioned in said opening;

wherein, in an initial state of said anchor before attachment to said anchor rail, said shaft and said base have a cross-section that is smaller than a cross-section of said outer edge;

wherein said plastic material deformation of said base engages said double cone of said rim.

2. An anchoring device according to claim 1, wherein said shaft and said base, in said initial state, have a smooth surface free of any projection.

3. An anchoring device according to claim 1, wherein said base, in said initial state, has a smooth surface free of any projection.

4. An anchoring device according to claim 1, wherein said head is formed by upsetting.

5. An anchoring device according to claim 1, wherein said anchor comprises a collar at a transition between said shaft and said base.

6. An anchoring device according to claim 1, wherein said anchor comprises an annular groove at a transition between said shaft and said base.

7. An anchoring device according to claim 6, wherein said plastic material deformation of said rim of said anchor rail comprises a bead that positive-lockingly engages said annular groove.

8. An anchoring device according to claim 1, wherein, in said initial state, said shaft and said base have an identical cross-section over an entire length of said shaft and said base.

9. An anchoring device according to claim 1, wherein, in said initial state, said shaft, said base, and said head have an identical cross-section over an entire length of said anchor.

10. An anchoring device according to claim 1, wherein, in said initial state, said base has a greater cross-section than said shaft and has a stepped transition into said shaft.

11. An anchoring device according to claim 1, wherein said anchor supports axial forces, acting on said anchor in a direction toward said longitudinal slot, via said plastic material deformation of said base engaging said first conical surface located adjacent to said outer edge.

12. An anchoring device according to claim 11, wherein said base overlaps positive-lockingly said first conical surface.

13. An anchoring device according to claim 11, wherein said anchor has a flattened transition between said base and said shaft and wherein said flattened transition overlaps positive-locking said first conical surface.

* * * * *